Nov. 19, 1940.     W. S. DIETRICH     2,222,335
CAR CONSTRUCTION AND METHOD
Filed Oct. 5, 1937     2 Sheets-Sheet 2
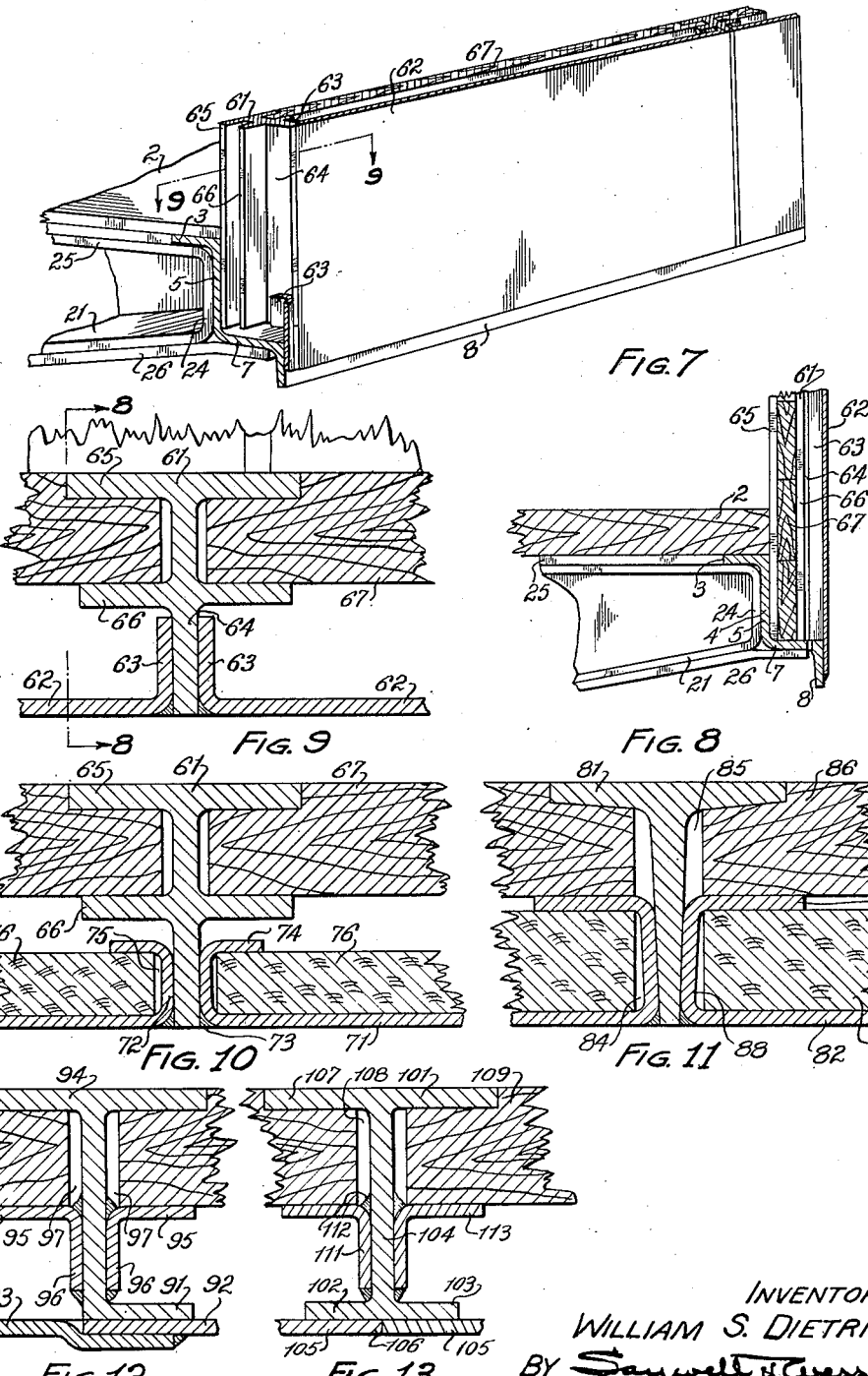
INVENTOR.
WILLIAM S. DIETRICH
BY Saywell & Cressler
ATTORNEYS.

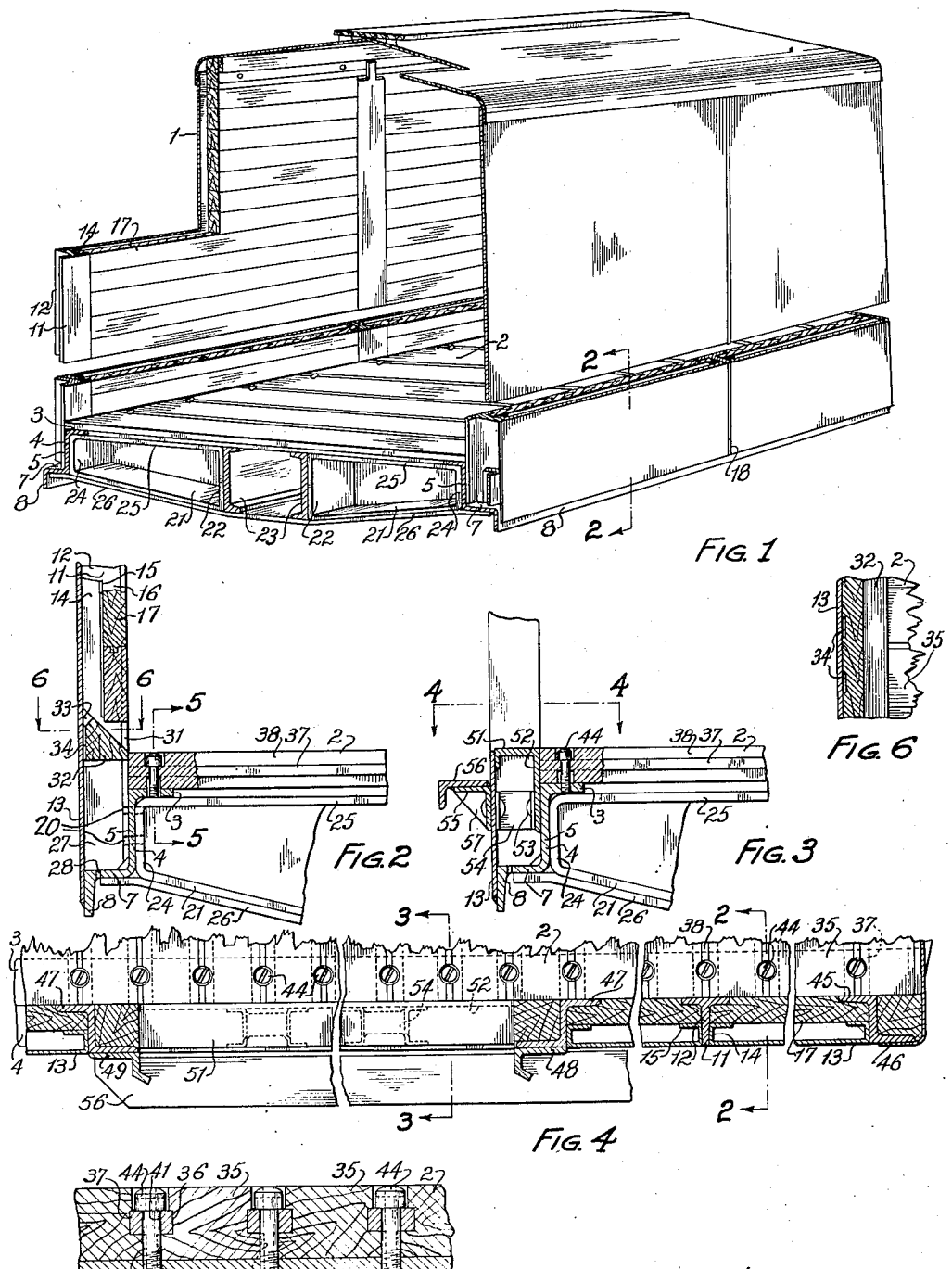

Patented Nov. 19, 1940

2,222,335

UNITED STATES PATENT OFFICE 2,222,335

CAR CONSTRUCTION AND METHOD

William S. Dietrich, Greenville, Pa.

Application October 5, 1937, Serial No. 167,419

10 Claims. (Cl. 105—409)

This invention, as indicated, relates to a car construction. More particularly, it comprises a special frame construction providing great rigidity for the body of a car or similar vehicle, such frame cooperating with the side and end walls and door elements to provide a more rigid and more serviceable structure than those heretofore available. The invention also involves the method of building a car construction which may be described as involving cantilever principles, whereby the structural members are so related that angular inertia loads are effectively taken care of without impairing the rigidity of the structure through long continued service.

The principal object of the present invention is to provide a car construction wherein the number of structural elements used is kept at a minimum, and wherein the members are so supported and related to each other that a greater degree of strength is provided for the structure than in present forms of such articles.

Another object of the invention is to provide a method of uniting the structural elements of a car in such manner that the structure is adapted for heavy duty service and brings about a saving in total weight over conventional constructions for the same purpose.

Another object of the invention is to provide a car structure wherein the parts cooperate to reinforce each other in a special manner and wherein the structure is peculiarly adapted to be readily assembled at a minimum of cost.

Another object of the invention is to provide a side wall, side post, and side sill construction for a car having means for draining condensation moisture from the inner walls thereof and providing for simple maintenance of such draining areas.

Another object of the invention is to provide a car construction wherein the side sill members are formed of deep girders preferably of W cross section, such girders cooperating with other parts to firmly hold the side posts of the car.

Another object of the invention is to provide a car construction wherein shorter diaphragms are used on the bolsters, and wherein the side sills may be readily secured to the diaphragms and tie plates, as well as providing extended supporting means for the side posts, and also affording reinforcing support for the deck and door track of the car.

Another object of the invention is to provide an improved deck member cooperating with the bolster and side sills to add rigidity to the car structure and at the same time bring about more economical use of the wooden boards or deck members.

Another object of the invention is to provide a simplified form of deck reinforcement which serves both as a structural steel strengthening element for the car structure, and at the same time affords a deck anchoring and frame reinforcing means, adapting such parts for long service with loads of concentrated character over localized areas.

A further object of the invention is to provide a side post of double T head cross section permitting a simplified form of side plate attachment and a more rigid side post for heavy duty car structures.

A further object of said invention is to provide a car structure to which insulating means against temperature changes may be readily applied without adding numerous structural elements or increasing unduly the weight of the car.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain means and methods embodying the invention, such disclosed means and methods constituting, however, but several of various forms in which the principle of the invention may be used.

In said annexed drawings:

Figure 1 is a fragmentary perspective view of the section showing a box car construction embodying the principles of the invention;

Figure 2 is a fragmentary vertical sectional view taken along the line 2—2 shown in Figures 1 and 4, looking in the direction of the arrows;

Figure 3 is a view similar to Figure 2, taken along the line 3—3 shown in Figure 4, looking in the direction of the arrows;

Figure 4 is a fragmentary plan view partly in section, taken along the line 4—4 shown in Figure 3, looking in the direction of the arrows;

Figure 5 is an enlarged fragmentary vertical sectional view taken along the line 5—5 shown in Figure 2, looking in the direction of the arrows;

Figure 6 is a fragmentary plan view, partly in section, showing the condensation drainage construction and taken along the line 6—6 shown in Figure 2, looking in the direction of the arrows;

Figure 7 is a fragmentary perspective view showing in enlarged detail a portion of the structure shown in Figure 1 and illustrating a modified form of side post construction;

Figure 8 is a fragmentary vertical sectional view showing a portion of the structure illustrated in Figures 7 and 9, as seen along the line 8—8 shown in Figure 9.

Figure 9 is a fragmentary enlarged horizontal sectional view taken along the line 9—9 shown in Figure 7, looking in the direction of the arrows;

Figure 10 is an enlarged fragmentary horizontal view similar to Figure 9, but showing means for supporting insulating material against the inner surface of the side walls;

Figure 11 is a view similar to Figure 10, showing the modified form of construction for supporting the inner and outer side walls with insulating material interposed;

Figure 12 is a fragmentary enlarged horizontal sectional view, showing a modified form of side post and inner and outer side wall construction; and Figure 13 is a view similar to Figure 12, showing a still further modified form of side posts and inner and outer side wall construction.

As clearly shown in Figures 1 to 6 of the drawings, the preferred form of construction comprises a box car 1 provided with a floor 2 supported at the lateral edges upon top flanges 3 of side sill members 4 of W cross section.

The side sill members 4 have extended vertical web portions 5 of substantially the vertical height of the ends of the cross frame members such as cross bolsters and cross bearers and the like, and are securely welded or otherwise fastened to the vertical end portions thereof. The W side sills have substantially horizontally positioned portions 7 connecting with the vertical portions 5 and at the ends of such horizontal portions have downwardly turned flanges 8 forming the lower portion of the girder structure provided by such side sill.

The side posts 11 shown in Figures 1 to 3 particularly are of T-shaped cross section with the head portions thereof bearing against the vertical web portions of the W side sills to which they are secured by welding or other fastening means. The outwardly projecting web portions 12 of the side posts preferably project slightly beyond the plane of the lower flange 8 of the side sills a distance to compensate for the thickness of the side plates 13 when the same are attached to the web portions of the side posts, in order to provide a substantially smooth outer surface for the side walls of the car.

The outer side walls are preferably formed of sheet metal plates bent inwardly at each vertical edge so as to provide areas 14 to conform to the surface of the outer portion of the web of the T section side posts, and at a point approximately at the mid distance of said web are turned to a position substantially parallel with the main body of the side plates to form flanges 15 spaced from the head portions of the side posts 11, and providing channels 16 intermediate inturned flanges and the T heads for reception of the ends of short sections of side wall boards 17. The side wall plates 13 are preferably of a length to cover the entire side portion of the car and their lower edges thereof overlap the lower flanges 8 of the W section side sills. Such lower edges may be welded to the side sills in the manner shown in Figures 2 and 3, and the space at the meeting of adjacent plates at the point of overlapping the side sill may be filled with welded metal 18 to present a uniform outer surface throughout.

The manner of engaging and securing the inner wall boards to the side wall posts may be similar to that disclosed in co-pending application Serial No. 159,133, filed August 14, 1937 and issued as Patent No. 2,208,450, July 16, 1940, and certain special features of engaging the side wall boards with the side posts will be described in detail hereinafter in connection with the constructions illustrated in Figures 9 to 13.

As has been set forth above, the head portions of the T cross section side posts rest against the vertical web portions of the W cross section side sills and are welded or otherwise secured to the outer faces thereof. Likewise the lower portions of the webs of the T section side posts may be welded to the horizontal portions of said W cross section side sills. Where cross bearer members are provided, as shown in Figure 1, such members may be built up of diaphragm members 21 set edgewise with their wider and inner flange portions 22 bearing against the central girders 23 running the full length of the car. The narrow outer flanges 24 bear against the webs 5 of the side sills, the upper flanges 3 of said side sills overlying the adjacent upper flange portions of said diaphragm plates. The top tie plate 25 rests upon the remaining portion of the top flange of the diaphragm plate and terminates in the plane of the inwardly turned top flange 3 of the side sill. A bottom tie plate 26 is provided, bearing against the upwardly and outwardly inclined lower flange of the diaphragm plate 21 and projects outwardly beyond the same to underlie the horizontal portion 7 of the side sill. Where rivets are used in place of welding, the rivet holes 20 will extend through the head portions of the T cross section side posts and the vertical web portions of the side sills and the vertical outer end flanges of the diaphragm plates, as indicated in dotted lines in Figure 2.

In like manner the horizontal portion of the flange may be connected with a bottom tie plate by rivets, and the top flange 3 may likewise be connected by rivets to the top flange of the adjacent diaphragm plate. However, it should be indicated that the welding of all these parts to each other is a preferred form of construction, inasmuch as such welding may be accomplished without introducing undue strains and with a greater structural rigidity in most instances than were other fastening means resorted to.

It will be noted that a space is left intermediate the side plates 13 and the lower portion of the T cross section side posts or the vertical portion of the side sills, and this space, designated by the reference character 27, provides a receptacle for the reception of condensation moisture. In order to permit the drainage of such moisture from such area a number of drainage holes 28 may be provided in the horizontal portion of the side sill. It will be noted that the side wall boards may terminate at a point slightly above the floor boards 35, in order to provide a space 31, as shown in Figure 2, through which any bulk material such as grain entering the space between the inner and outer side walls may flow upon the removal of such material from the car.

It is customary for such purpose to provide a triangular strip to divert the bulk material flow outwardly beneath the inner side wall boards. Such strip in the present construction may be in the form of triangular members 32 of a length sufficient to extend between the web portions of two adjacent side posts, the triangular face terminating at the floor level of the car at its inner end and extending upwardly to a point of merger with the inner face of the side plates of the car. Such upper edge of the triangular strip is preferably provided with a beveled area 33 to act as a moisture diverting trough communicating with a plurality of vertical grooves 34 cut in the outer face of the block, as shown more particularly in Figures 2 and 6. Such grooves communicating with the space 27 heretofore referred to, in order to prevent oxidation of the metal walls about such space 27, the same may be coated with asphaltic material to render the same moisture proof. The accumulated condensation of the moisture as well as any foreign material which may enter the space 27 may be readily removed through the apertures 28 heretofore referred to through the horizontal portion of the side sills through the use of an air or steam jet, in the event the same should become obstructed.

In order to greatly increase the structural strength of the lower portion of the car frame, it may be desirable to use a flooring of special design, such as is shown more clearly in Figures 2 to 5 inclusive. One type of floor 2 which may be utilized includes floor boards 35 of the type shown in Figure 5, the ends of which rest upon the top flanges 3 of the side sills, the floor boards having grooves 36 at each of their sides to receive the horizontal projecting portions 37 of metal locking and reinforcing strips 38 of somewhat cruciform cross section. Such strips are interposed between the meeting edges of the floor boards with their horizontal portions acting as tongues to engage and interlock the floor boards to each other and with their vertical portions serving as bracing elements to bear against the understructure of the car frame, with their ends resting upon the side sill as stated. The upper edges of the metal strips lie substantially in the plane of the upper surface of the floor boards and serve to receive a large portion of the weight where imposed upon the surface of the floor through heavy service loads.

The method of fastening the floor to the understructure of the car frame may be of the type illustrated in Figures 2 and 5 more particularly, wherein the vertical portions of the reinforcing strips are cut away above and below the horizontal portion and a hole 41 is provided to receive a bolt end portion 42 screw-threaded at its lower end to engage a screw threaded aperture 43 provided in the top flange 3 of the side sill. A fillister head 44 provides means of securing the strip to the side sill with the adjacent floor boards interlocked therewith. The fillister head preferably is of a size to substantially fill the opening and thus provide a floor practically of unbroken surface area throughout the full space between the head portions of the side posts and the associated side walls in the plane thereof.

The side post construction just described is carried through the main body portion of the car, but at the end portions thereof, and at the door openings a slightly different construction may be employed. Thus it will be noted in Figure 4 that a Z bar 45 is used adjacent the end of the car structure. The outer flange of the Z bar serves as a support for the conventional end frame 46 of the car. The side plates 13 coact with the Z bar in the same manner as with the T section side posts heretofore described.

At the door opening similar Z bars 47 may be used, such bars being provided with outer flange plates 48—49 on the respective sides, integrally secured thereto, the plates 48 and 49 having their outwardly projecting flanges turned in the same direction to provide clamping action upon the adjacent door frame members when the door is in closed position. The threshold of the door, as is shown in Figure 3, is preferably formed of an angle plate 51 having its upper surface on the level of the floor 2 and having an inner flange 52 resting against the end of the flooring and secured to the vertical web portion 5 of the side sill by means of rivets 53 or other fastening elements. Such rivets preferably also secure in position an intermediate bracing member 54 of flanged sheet metal and of substantially rectangular shape. The outer portion of said bracing member bears against the inner face of the outer plate 13 of the side wall at a point where an angle plate 55 is provided to support the flange of the bottom trackway 56 of the door. Such angle plate may have triangular supporting webs 57 at intervals to reinforce the same. The upper trackway of the door may be of conventional construction. The side plates 13 of the car structure may bear against and be secured to the intermediate web portions of the Z bars 47 of the door frame in the same manner as they are secured to the webs of the Z bars 45 heretofore described.

In place of using a side post of T shaped construction, it may be found desirable to provide a side post 61 of double T cross section, as shown in Figures 7 to 10 inclusive. The construction in such instance will be substantially the same as that heretofore described, but the side plates 62, instead of being turned inwardly and then back upon themselves to provide a flange for supporting the inner side wall boards, are merely turned inwardly to provide a flange 63 to bear against the web 64 of the double T cross section side posts.

The double T head, it will be noted, provides in effect an outer flange 65 and an inner flange 66 in parallel spaced relation, and the reduced end portions of the side wall boards 67 may be engaged between said flanges in the manner shown in Figure 9.

The floor construction may be substantially identical with that heretofore described, the floor 2 bearing directly against the outer flange 65 of the double T head. The other portions of the car structure are substantially identical with those heretofore described and identical characters have been applied thereto. In the form of construction shown in Figure 10 the manner in which the device may be utilized to support insulating material is shown. In such case the double T cross section side post 61 is identical with that illustrated in Figure 9. The side plates 71, however, are turned inwardly to provide the flanges 72 to rest against the web portions of the side posts to which they are secured by means of welds 73, and are then turned backwardly upon themselves to provide short flanges 74 parallel to the main body of the plates forming an intermediate channel 75 within which the slabs 76 of insulating material are received. Such material may be in the form of cork or like composition, or any suitable insulating material, and it will be noted that between the inner faces of such insulating blocks and the outer surfaces of the inner side wall boards air space is provided, which also serves as an insulating medium.

The inner faces of the side posts, whether of single T, double T, or Z bar construction or the like, may be provided on their inner surfaces with a coating adapted to prevent or reduce the effects of the collection of moisture condensation upon their surfaces.

The structure shown in Figure 11 illustrates an application of insulating material to the side walls of a car wherein the side post 81 is of T cross section, and the side plates 82 are secured thereto by bending the same inwardly at their side edges to provide a portion 88' overlapping the outer webs of the side posts and thence backwardly upon themselves by a short section, providing a channel area within the same and providing a second channel area 85 intermediate such short side flanges 83 and the head portions of the T section side posts. Within the space 85 the side wall boards 86 may be secured in the manner heretofore described, and as shown in Figure 11 and in the channels 84 the insulating material 87 may be engaged in the manner shown in Figure 11.

In place of utilizing the side wall flanges to provide a support for the side plates, each side post may be formed with a flange 91 at its outer portion against which the side plates 92—93 may rest, the plate 93 being bent outwardly and overlapping the marginal portion 92. In such event the side post is preferably provided with a T head 94 and is also provided with a plurality of short angle bars 95 having a portion 96 overlying the outer web portion of the side posts, and having a companion flange portion in spaced parallel relation to the T head section, thus providing a channel 97 therein, within which the side wall boards 98 may be engaged in the manner heretofore described.

A somewhat similar construction may be utilized by providing a side post 101 somewhat similar to the side post shown in Figure 12, but having a flange 102—103 on each side of the web portion 104. Thus, in Figure 13, the side plates 105 may be attached without bending the same in any manner whatsoever, such plates meeting in endwise abutment, the seam 106 being preferably welded. The inner side walls in such instance may be supported by means of angle plates 113, having a portion in spaced relation to the inner flange 107 of the side post to provide a recess 108 within which the side boards 109 may be engaged. Such angle bars have portions 111 overlying the outer portions of the web 104 and may be secured thereto by means of welded seam lines 112.

While a particular type of car construction has been illustrated and several types of combinations of the structural elements have been disclosed, it is to be understood that the features of this invention may be combined in various other relations than those shown particularly.

The method involved in the invention has already been referred to and comprises the steps of uniting of the structural elements of a car so that the side posts thereof embody cantilever principles to resist angular inertia loads through the supporting of such side posts over extended areas adjacent their lower end portions against the frame, which in turn is strongly reinforced through a reinforced flooring, the number of elements of the car structure being kept at a minimum. In other words, the method provides for so relating the floor structure, underframe structure, side posts and inner and outer walls, that no auxiliary parts such as nailing strips for floor or side walls are required, and at the same time providing for saving of metal through the narrowing of the underframe structural elements, normally of greater weight than other elements, but carrying their relatively lighter side walls outwardly thereof, so as to provide an equal, if not greater, interior area for the car structure. Thus increased capacity with greater strength and fewer parts is effected through the methods and constructional features of this invention.

The connections of the side posts to the side sill are in shear and the posts and side sills are of light weight, and of sectional outlines providing increased strength. The threshold plate serves as a reinforcement as well as a supporting surface and the tendency to buckle of the outer side plates of the car is counteracted through the special connection with the web portions of the side posts.

In addition provision is made for counteracting the effects of moisture condensation on the metal surfaces of the car and for preventing entrapment of the bulk material within the wall areas of the car. The construction accordingly provides for superior strength as well as less weight and cost of production, and at the same time reduces cost of maintenance and repairs.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. A car construction having in combination, a horizontal frame of substantially rectangular outline, upright frame members having intermediate outwardly facing webs said upright members being supported against the outer sides of said frame, and inner and outer walls, the outer wall being in the shape of panels with inturned lateral flanged edges forming inner wall spacers, said lateral edges being welded to the frame uprights, and with the intermediate outwardly facing edges of the webs of said upright frame members flush with the outer surface of said outer wall panels, portions of said inturned edges of the outer wall bearing against the inner wall.

2. A car construction having in combination, a horizontal frame of substantially rectangular outline, upright frame members having intermediate outwardly facing webs said upright members being supported against the outer side of said frame, and inner and outer walls, the outer wall being in the form of panels with inturned lateral flanged edges forming lateral channels of flattened U-shaped cross-section, said lateral edges being welded at their line of contact to the frame uprights, and with the intermediate outwardly facing edges of the webs of said upright frame members flush with the outer surface of said wall panels, and the inner portions of said channels cooperating with said uprights to provide space to receive the inner wall members for said car construction.

3. A car construction having in combination, a horizontal frame of substantially rectangular outline, upright frame members having intermediate outwardly facing webs said upright members being supported against the outer sides of said frame, and inner and outer walls, the outer wall being in the form of panels with inturned lateral flanged edges forming inner wall spacers, said lateral edges being welded to the frame uprights and with the intermediate outwardly facing edges of the webs of said upright frame members flush with the outer surface of said outer wall panels and with said inner and outer wall lying wholly within longitudinal vertical planes at the inner and outer faces of said uprights.

4. A car construction having in combination, a horizontal frame of substantially rectangular outline, upright frame members of T head cross-section with the central web portions thereof extending outwardly, and outside flanged side wall plates positioned at opposite sides of said web portions, said side wall plates being in the form of panels with inturned lateral flanged edges forming inner wall spacers, the lateral flanged edges being welded to the frame uprights with the intermediate outwardly facing edges of said upright frame members flush with the outer surface of said outer wall panels.

5. A car construction having in combination, a horizontal frame of substantially rectangular outline, upright frame members of double-T head cross-section with central web portions thereof extending outwardly, and outside side wall plates having inwardly directed end flanges at right angles to the body of said plates and having said flanges secured to the opposite sides respectively of said web portions of said uprights, with the intermediate outwardly facing edges of said upright frame members flush with the outer surface of said side wall plates.

6. A car construction having in combination, a horizontal frame of substantially rectangular outline, upright frame members of double-T head cross-section with central web portions thereof extending outwardly, and inwardly flanged side wall plates secured at opposite flanged ends to the side of said web portions of said uprights with the intermediate outwardly facing edges of said upright frame members flush with the outer surface of said side wall plates, and inside longitudinally extending vertical side wall boards engaged with their ends between the double-T heads of the adjacent uprights respectively.

7. An article of the character described having in combination, a horizontal frame comprising W-section side girders set edgewise to form sills, cross-members in the horizontal plane thereof and connected thereto at their respective ends, uprights having outwardly facing webs secured to the outer faces of the side girders and lying wholly within the vertical plane thereof, and outside and inside wall members interposed between said uprights and lying wholly within the vertical planes at the inner and outer faces, the outer wall being in the form of panels with inturned lateral flanged edges forming inner wall spacers, the lateral edges being welded to the frame uprights with the intermediate outwardly facing edges of the webs of said upright frame members flush with the outer surface of said outer wall panels.

8. A frame for vehicle bodies, comprising a pair of spaced parallel integral side sills each having an intermediate vertical portion, an inwardly turned horizontal flange at the top edge of said intermediate portion and an outwardly turned horizontal portion at the lower edge of said intermediate portion and having a depending flange at the outer edge thereof to provide a point of attachment for the plates forming the outside walls of said vehicle structure, crossmembers in the plane of said side sills secured at their ends respectively to said intermediate vertical portions and providing bracing for the frame intermediate the posts adjacent a door opening, upright members having intermediate outwardly facing webs resting on the outwardly turned portions of said respective side sills and secured to the vertical intermediate portions thereof, the outer portions of said upright members lying slightly outside of the vertical plane of the depending flanges, and outer side wall plates secured to said depending flanges and having inturned side edges secured to the side faces of adjacent upright members with the intermediate outwardly facing edges of said upright members flush with the outer surface of said outer side wall plates.

9. A car construction having in combination, a horizontal frame of substantially rectangular outline, said frame comprising cross members at spaced intervals and longitudinal side sills having marginal flanges and an intermediate web, such intermediate web being connected to the ends of said cross members, side posts having outwardly extending web portions, said side posts connected to the intermediate webs of said side sills, side wall plates having inturned vertical edge portions with inner margins spaced from and parallel to said side wall plates providing inner channel members, such inturned ends being connected with the web portions of said side posts at their line of contact, and insulating means engaged in the channel portions of said side wall plates.

10. A car construction having in combination, a horizontal frame of substantially rectangular outline, said frame comprising cross members at spaced intervals and longitudinal side sills having marginal flanges and an intermediate web, such intermediate web being connected to the ends of said cross members, side posts having outwardly extending web portions, said side posts connected to the intermediate webs of said side sills, side wall plates having inturned vertical edge portions with inner margins spaced from and parallel to said side wall plates providing inner channel members, such inturned ends being connected with the web portions of said side posts at their line of contact, the space intermediate at least two of said side posts being free of side wall plates to provide a door opening, a threshold plate connected to a side sill and wall plate and interposed between said two side posts to form a supporting surface and a bracing and reinforcing member between the posts adjacent the door opening, and angular locking bars secured to the outer portions of said side posts to provide a door locking closure.

WILLIAM S. DIETRICH.